(12) United States Patent
Benoliel

(10) Patent No.: US 9,365,086 B2
(45) Date of Patent: Jun. 14, 2016

(54) MODULAR TRANSPORTATION VEHICLE

(71) Applicant: Eli Benoliel, Or Akiva (IL)

(72) Inventor: Eli Benoliel, Or Akiva (IL)

( * ) Notice: Subject to any disclaimer, the term of this patent is extended or adjusted under 35 U.S.C. 154(b) by 0 days.

(21) Appl. No.: 14/378,672

(22) PCT Filed: Feb. 14, 2013

(86) PCT No.: PCT/IL2013/050143
§ 371 (c)(1),
(2) Date: Aug. 14, 2014

(87) PCT Pub. No.: WO2013/128438
PCT Pub. Date: Sep. 6, 2013

(65) Prior Publication Data
US 2015/0015017 A1    Jan. 15, 2015

Related U.S. Application Data

(60) Provisional application No. 61/598,382, filed on Feb. 14, 2012.

(51) Int. Cl.
*B60P 3/34* (2006.01)
*B60F 1/02* (2006.01)
*B61B 15/00* (2006.01)
(Continued)

(52) U.S. Cl.
CPC ... *B60F 1/02* (2013.01); *B60F 1/00* (2013.01); *B61B 15/00* (2013.01); *B61D 15/00* (2013.01); *B61F 13/00* (2013.01); *B62D 31/006* (2013.01); *B62D 31/025* (2013.01); *B62D 47/006* (2013.01); *B62D 63/025* (2013.01)

(58) Field of Classification Search
CPC ..... B60W 20/00; B60W 10/06; B60W 10/08; B60L 11/14; Y02T 10/645; G01C 21/32; G08G 1/0104; G08G 1/14; G08G 1/096716; G08G 1/096775
USPC .......... 296/26.02, 26.11, 26.08, 26.07, 26.01, 296/26.04, 26.06
See application file for complete search history.

(56) References Cited

U.S. PATENT DOCUMENTS 3,822,655 A * 7/1974 Benedict .................. A01G 1/12
                                                                        111/11
3,884,156 A * 5/1975 Ames ...................... B60F 1/043
                                                                        105/72.2
(Continued)

FOREIGN PATENT DOCUMENTS

AT           209949        7/1960
CN        201423887        3/2010
(Continued)

OTHER PUBLICATIONS

International Preliminary Report on Patentability Dated Aug. 28, 2014 From the International Bureau of WIPO Re. Application No. PCT/IL2013/050143.
(Continued)

*Primary Examiner* — Kiran B Patel

(57) ABSTRACT

A vehicle module having a height, a width and a length, front and rear vertical panels and a horizontal floor, and wherein said height and width are adjustable and the front and rear vertical panels are foldable to allow enlargement of an empty module to pass over another module. The modules are useful for transport of passengers or goods, particularly in a guided rail system.

6 Claims, 17 Drawing Sheets

(51) Int. Cl.
*B60F 1/00* (2006.01)
*B61D 15/00* (2006.01)
*B61F 13/00* (2006.01)
*B62D 31/00* (2006.01)
*B62D 31/02* (2006.01)
*B62D 47/00* (2006.01)
*B62D 63/02* (2006.01)

(56) References Cited

U.S. PATENT DOCUMENTS

| | | | | |
|---|---|---|---|---|
| 3,892,187 | A | | 7/1975 | White, Jr. |
| 4,380,198 | A | * | 4/1983 | White, Jr. ............... B60F 1/043 105/26.1 |
| 4,878,436 | A | * | 11/1989 | Lich ........................ B61J 3/12 105/215.2 |
| 6,039,135 | A | * | 3/2000 | Henderson ............... B60P 1/43 104/88.04 |
| 6,101,953 | A | * | 8/2000 | Spata ..................... B61C 11/005 105/215.1 |
| 6,138,783 | A | * | 10/2000 | Chene ..................... B61D 13/00 180/11 |
| 6,199,485 | B1 | * | 3/2001 | Pyle ........................ B60F 1/043 105/26.1 |
| 6,352,035 | B1 | * | 3/2002 | Kashiwase ............... B60F 1/043 104/154 |
| 6,374,948 | B1 | * | 4/2002 | Stack ........................ B61K 3/02 104/2 |
| 6,988,451 | B2 | * | 1/2006 | Marcotte ................. B60F 1/043 105/215.1 |
| 7,726,674 | B2 | * | 6/2010 | VanDenberg ........... B60G 11/225 267/189 |
| 7,740,255 | B2 | * | 6/2010 | Holt ....................... B60G 7/001 280/124.11 |
| 8,226,098 | B2 | * | 7/2012 | VanDenberg ........... B60G 3/145 280/124.106 |
| 2002/0000357 | A1 | * | 1/2002 | Henderson .............. B61B 15/00 193/35 R |
| 2009/0299563 | A1 | * | 12/2009 | Mikosza ................... B60F 1/00 701/25 |

FOREIGN PATENT DOCUMENTS

| | | |
|---|---|---|
| CN | 101934682 | 1/2011 |
| DE | 2351493 | 4/1975 |
| DE | 2526103 | 2/1976 |
| DE | 3602675 | 7/1987 |
| WO | WO 01/49544 | 7/2001 |
| WO | WO 2011/013124 | 2/2011 |
| WO | WO 2013/128438 | 9/2013 |

OTHER PUBLICATIONS

International Search Report and the Written Opinion Dated Jun. 13, 2013 From the International Searching Authority Re. Application No. PCT/IL2013/050143.

Notification of Office Action and Search Report Dated Dec. 30, 2015 From the State Intellectual Property Office of the People's Republic of China Re. Application No. 201380009152.1.

Translation Dated Jan. 11, 2016 of Notification of Office Action Dated Dec. 30, 2015 From the State Intellectual Property Office of the People's Republic of China Re. Application No. 201380009152.1.

* cited by examiner

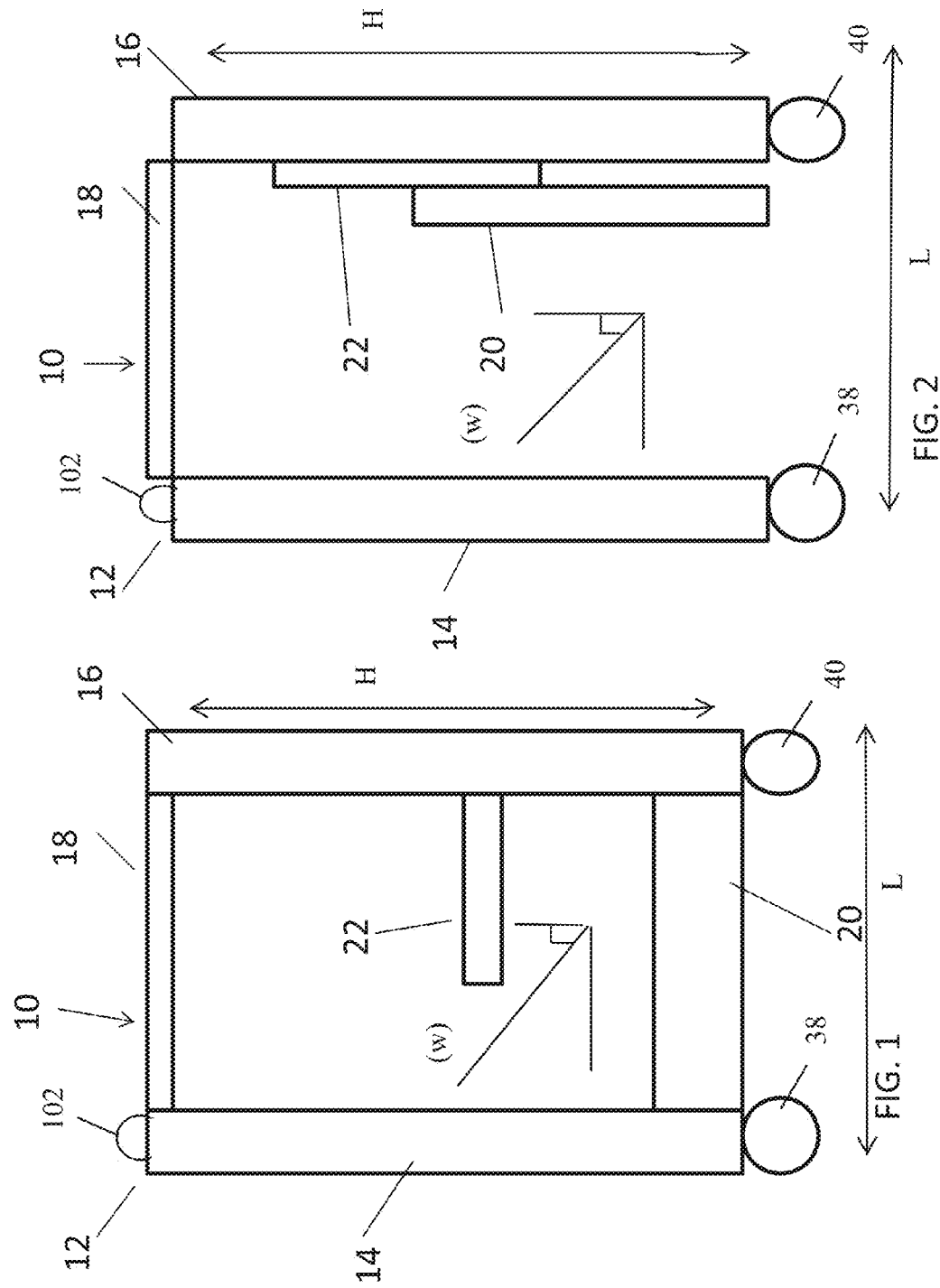

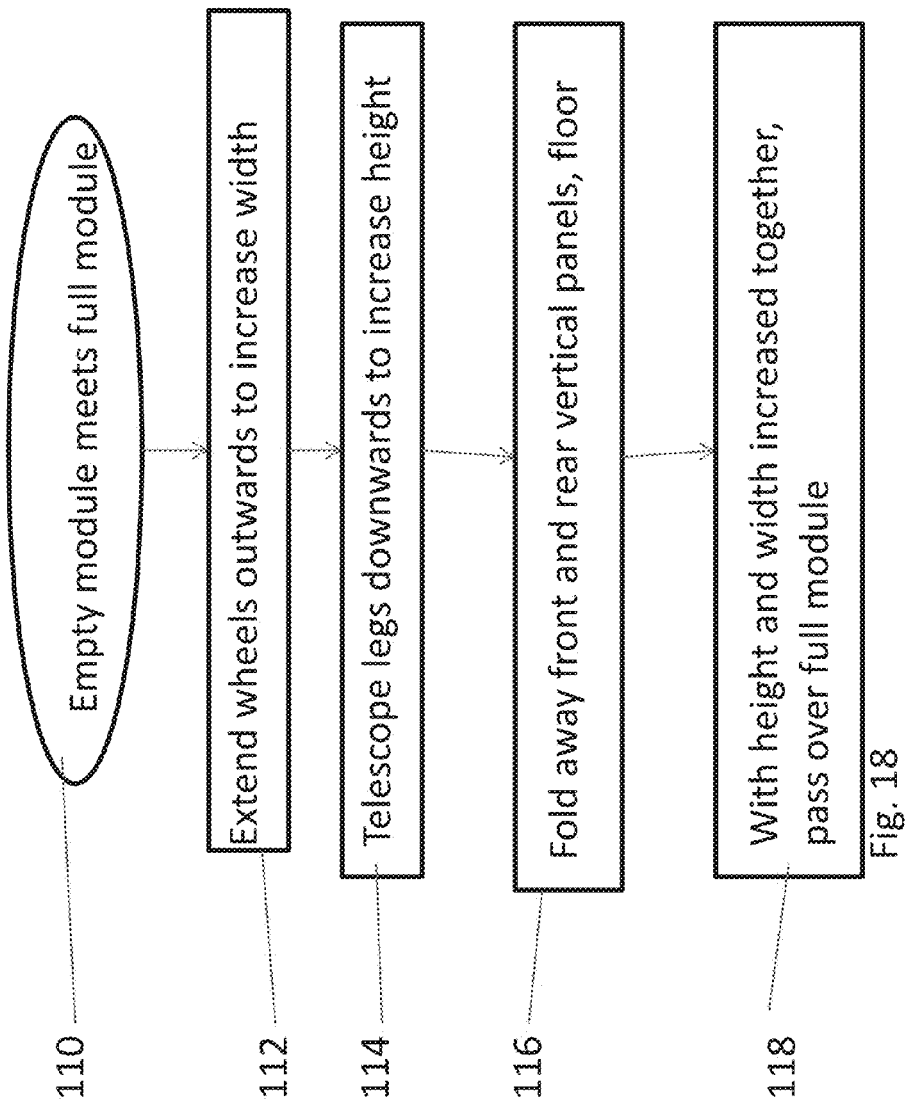

MODULAR TRANSPORTATION VEHICLE

RELATED APPLICATIONS

This application is a National Phase of PCT Patent Application No. PCT/IL2013/050143 having International filing date of Feb. 14, 2013, which claims the benefit of priority under 35 USC §119(e) of U.S. Provisional Patent Application No. 61/598,382 filed Feb. 14, 2012. The contents of the above applications are all incorporated by reference as if fully set forth herein in their entirety.

FIELD AND BACKGROUND OF THE INVENTION

The present invention, in some embodiments thereof, relates to a modular transportation vehicle and a system of use thereof and, more particularly, but not exclusively, to a modular vehicle for shared public transportation.

Transportation is the way of moving an Object from one place to another through a medium using a carrier.

The objects can be information, goods, animals or people. The medium can be Land (roads, rails, tunnels), Air, Wire (copper or fiber optics), Water (Sea/ocean) or Space. The carrier can be a land vehicle, boat, aircraft, Electromagnetic radiation including Light and Acoustic waves, including ultrasonic waves.

The difference between the mediums is the capacity and the speeds of the carrier.

For example, light propagates in air at 300,000,000 m/S (300,000 Km/S) while a Car may reach 25 m/s (90 Km/h), a result with a ratio of 1:12,000,000. Capacity can be from almost zero mass (Photons), through dozens of Kilograms for human and tons for bulky goods.

For many years two major methods where used to transport peoples and matter, namely roads and ships. Roman roads were made of stone, although today roads are made from concrete or asphalt. Wheeled vehicles are used as carriers over roads. More recently trackways with guiding rails have been used introduced for wheeled vehicles.

Rails are dedicated trackways where the carrier is a Train or bus which can be powered by fuel or electricity.

A collection of roads or rails, or for that matter a wire infrastructure for data propagation, covering a certain area (such as a city or a state or even worldwide) is called a network.

The present embodiments focus on moving people and goods in cities and between cities.
The Problem:

Over the years city populations have grown and city sizes have increased, making greater mobility a necessity for humans both for work and pleasure. The number of vehicles has increased, leading to congestion and dramatically slowing the speed of the carriers over the roads. The main problem causing traffic congestion is the fact that the network is filled with many carriers which are arranged in queues due to the nature of the car and roads. Unfortunately today cars cannot drive through other cars and each of them is conducted by a human. Since individuals naturally differ, different human have different response times, and the result is a dramatically degraded performance of the network which is measured by its capacity (bandwidth) and the delay added to the maximum travel time between two points due to network congestion.

A weakness of the network is the fact that it is enough that a single vehicle slows down or stops, and, regardless of the reason (Car accident/obstacle on the Road) it will delay or stop all the cars that follows. It is well known that if an event can be seen on the side of the road, such as an accident, it cause other drivers to reduce their attention to the road because of curiosity and slowing the car in order to see the obstacle. This results in a delay which propagates through to the following vehicles.

Also, not all drivers follow straight lines when driving, again causing following vehicles to slow and introducing turbulence into the vehicle flow. This can be solved by forcing vehicles to follow guide tracks defined by rails, but this requires a standard size of vehicle, and can lead to catastrophic delays when one vehicle breaks down in the guide tracks, since the following vehicles are unable to go round.

Another reason for degradation in network performance is the fact that in order to synchronize the network, traffic lights are used. In this case each driver has a different reaction time and delay may accumulate.

In order to be able to increase the capacity of the network, dedicated roads, dedicated parts of roads such as bus lanes, or rail can be used and large carriers such as train and buses may be used as shared transportation to carry many people at the same time therefore reducing the number of drivers and cars. The problem with the public transport solution is its efficiency. Eventually efficiency is measured in money which comes down to the average cost of moving a human (Kg) per Km. This cost is the sum of the Infrastructure (Construction and maintenance), Energy, and Operation. Since traffic reflects human behavior, traffic peaks arise when people are going to and returning from work, and big carriers (Trains/Buses) are used that have the capacity to accommodate the peak time transport. But when the needs for transportation reduce during the course of the day and particularly at night, when many people are asleep, the same large vehicles are all that is available and have to be used even though they may be running mostly empty. Thus efficiency is reduced dramatically and therefore in order to be economical the frequency of transportation service or quality of service (QoS) is reduced by the service providers. This causes fewer people to rely on public transport and convinces them that they must have their own private transport for normal living.

There are further disadvantages for modern transportation which are: Energy consumption, Pollution, Accidents and others. Over the last 40 years, energy costs have increased dramatically, having an effect on the entire economy. Many countries are highly dependent on imported fuel and the consumer fuel price does not obey the free market competition rules and therefore twists the whole economic structure.

SUMMARY OF THE INVENTION

A folding modular vehicle can run on standard roads or on guided trackways.

Each module may be designed for a predetermined number of passengers. At peak hours more modules are run than say late at night when there are fewer passengers.

Selective foldability allows out-of service modules to pass other modules on the guided trackways, and in other configurations the modules can serve as raised ramps to allow passengers or goods to cross to another waiting module or to allow in-service modules to pass other in-service modules. The guided trackways may be electrically powered, and the modules may be driverless modules, at least within the trackways.

Unwanted modules may be removed from the trackways immediately when surplus to requirements, simply by driving the vehicle over other vehicles.

According to an aspect of some embodiments of the present invention there is provided a vehicle module having a height, a width and a length, front and rear vertical panels and a horizontal floor, and wherein the height and width are adjustable and the front and rear vertical panels are foldable to allow enlargement of an empty module to pass over another module.

An embodiment may comprise a wheeled vehicle having axles at each wheel, at least some of the axles further having an actuator located therewith to extend a corresponding wheel outwards, thereby to adjust the width.

An embodiment may comprise downwardly extending telescopic legs, therewith to adjust the height.

An embodiment can comprise a wheeled vehicle and having axles at each wheel, at least some of the axles further having an actuator located therewith to extend a corresponding wheel outwards, thereby to adjust the width, further comprising downwardly extending telescopic legs, therewith to adjust the height, the axles and the legs being operable together to raise the wheels and then extend the wheels outwardly to rest on surrounding raised wheel guides, thereby to pass the vehicle module over another vehicle module.

An embodiment may comprise a plurality of sensors to determine own speed and location and speed and location of surrounding objects, and a processor to generate a safe drive path.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a simplified schematic diagram of a vehicle module according to a first generalized embodiment of the present invention;

FIG. 2 is a simplified schematic diagram of the module of claim 1 folded into a bridge configuration to pass over other vehicles;

FIG. 18 is a simplified flow chart illustrating the process of an empty vehicle meeting and passing a full vehicle.

DESCRIPTION OF SPECIFIC EMBODIMENTS OF THE INVENTION

Figure 3:
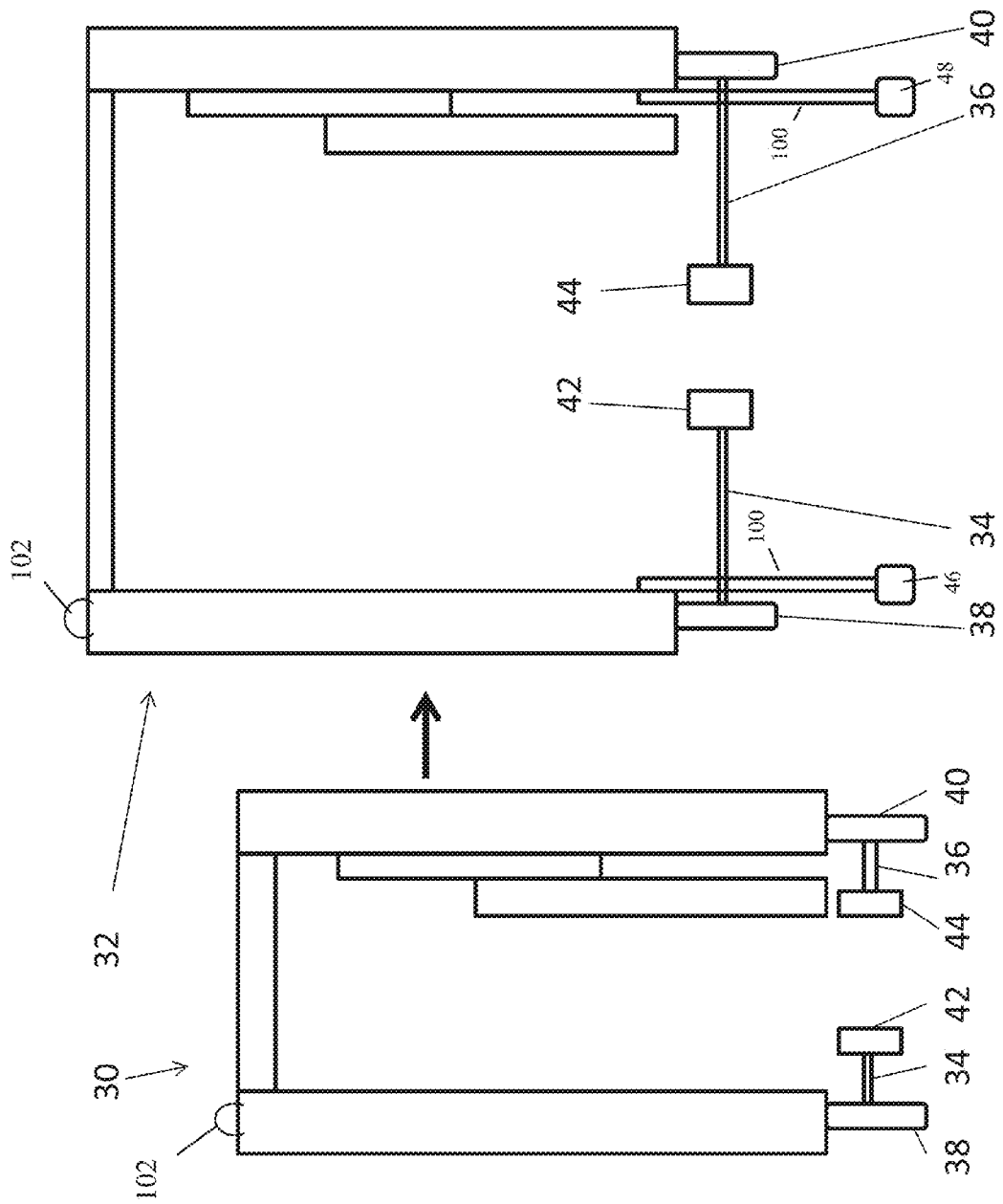
FIG. 3 illustrates schematically the folded vehicle of FIG. 2 being raised upwardly by the dropping of telescopic legs and being increased in width by extending of the wheel axles, according to an embodiment of the present invention.

The present invention, in some embodiments thereof, relates to a modular vehicle and an associated transport system and, more particularly, but not exclusively, to a general transport system involving driverless modular vehicles and both standard roads and guide tracks. In particular the vehicle modules are able to drive both in guided lanes or trackways and without guidance in standard flat roads. The vehicle modules are able to use the raised guides to allow a presently unused module to raise itself up and pass another vehicle in the guideway. Thus a vehicle stopping in the guideway for any reason does not needlessly hold up other vehicles. The vehicles may use internal fuel supplies or they may draw on electrical supplies provided along the roadway, and the vehicle modules may be driverless.

The present embodiments are useful in providing a high quality public transport services. During hours of peak demand, large numbers of modules may be run, and at hours of lower demand fewer modules need be run. As drivers are not involved it is always possible to provide high frequency services at any hour of the day without any waste. The idea is that the frequency is chosen for convenience of the users and more or less maintained throughout the day, but what is altered is the number of modules.

The modules are not limited to public passenger transport but may be used for transport of goods and provision of other services as well. Within the passenger transport field as well, vehicles may be used on fixed routes for passenger sharing, and other vehicles may be hired by individuals for specified routes.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 is a schematic diagram that illustrates a vehicle module 10 having a housing 12. The housing has a height (h), a width (w) and a length (l), and includes front 14 and rear 16 vertical panels, optionally also side panels to a greater or lesser extent and a horizontal roof 18 and floor 20. One or more foldable seats 22 may be provided for passengers. The height and width of the module are adjustable, as will be explained in greater detail below— see FIGS. 3, 30 and 32. and the front and rear vertical panels can be folded away— see FIGS. 6 and 7. The module, in the enlarged and folded state, can pass over another module as shown in FIG. 7.

Reference is now made to FIG. 2, which is a simplified diagram showing the module of FIG. 1 in which the floor panel 20 and the passenger seat 22 are folded away.

Reference is now made to FIG. 3, which is a simplified diagram showing a module in a folded state, passing from a low and narrow configuration 30 to a tall and wide configuration 32 so that it can fit around and over another vehicle that it needs to pass.

The vehicle 10 is a wheeled vehicle with axles 34 and 36 at each wheel 38 and 40. Only two wheels are shown for simplicity. The axles are equipped with actuators 42 and 44, so that they can be extended outwards in the horizontal direction, thus extending the width (w) of the housing 12 and increasing the width between the wheels. The standard extent of the wheels may be selected for the module to fit into a guide way in between guide tracks. The increased width may be selected for the wheels to fit on the guide tracks.

Telescopic legs 100 may extend downwardly from the housing in order to give the vehicle greater height (h). The extended position of the embodiment of FIGS. 1 and 2 is shown in FIG. 3. The telescopic legs 100 may have wheels or castors 46 and 48 in order to pass over other vehicles on a flat roadway. On guide rails however the standard wheels 38, 40, resting on the guide rails, would normally support the module while passing over other vehicles.

Thus the telescopic legs 100 serve to raise the standard wheels 38, 40, up to the level of the guide rails, and to place the standard wheels 38, 40, on the top of the guide rails.

Alternatively, where there are no guide rails, or the guide rails are not of suitable configuration, the telescopic legs 100 take the place of the wheels 38, 40, to support the vehicle at an increased height while moving.

In one embodiment, sensors 102 on the module determine the module's speed and location, and the speed and location of surrounding objects, and a processor generates a safe drive path. The processor may receive GPS information which is modified using visual cues about the road, so as to provide a driverless vehicle.

Figure 4:
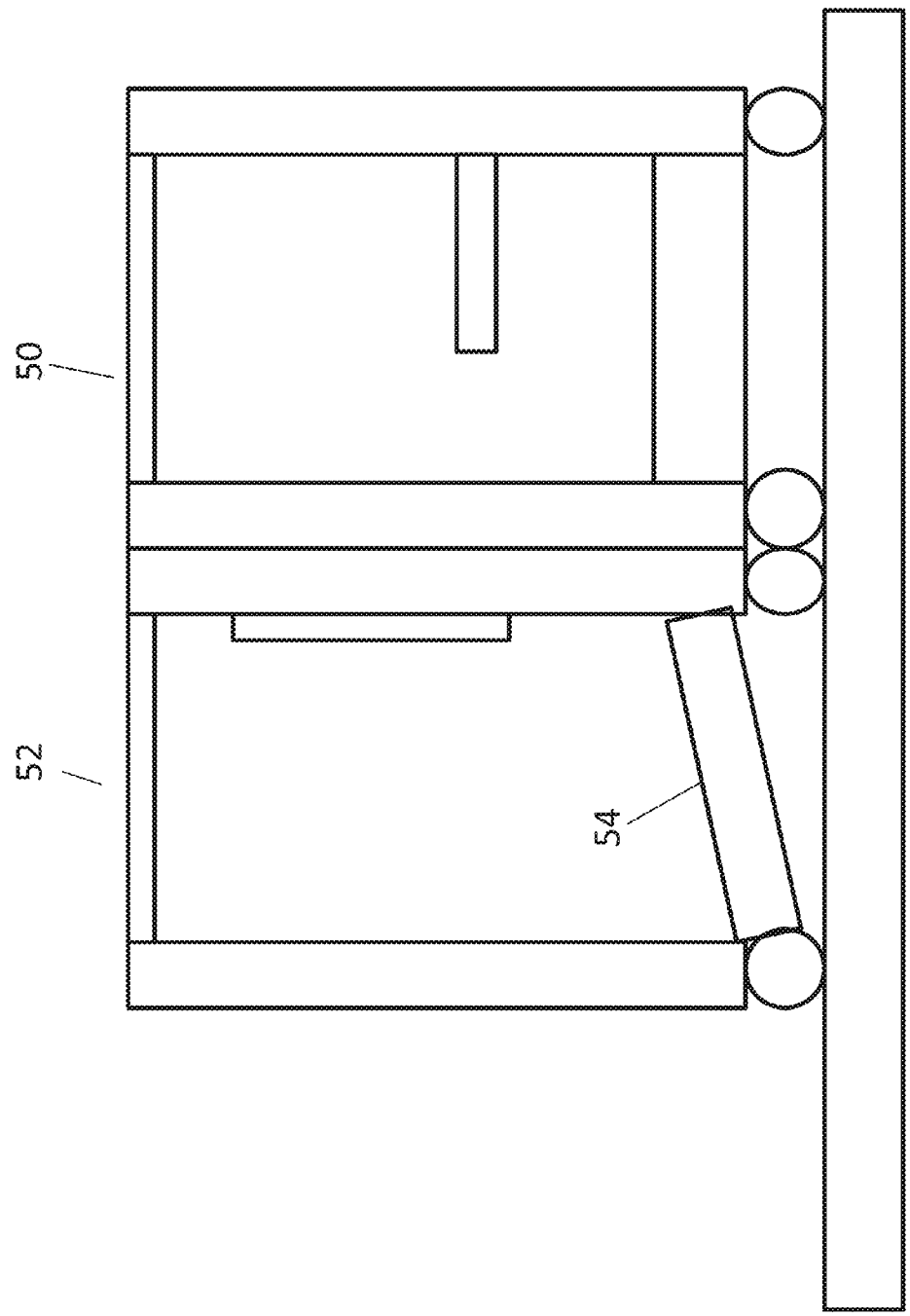
FIG. 4 is a simplified diagram of a vehicle module of the present embodiments acting as a ramp for a second module.

Reference is now made to FIG. 4, which is a simplified diagram showing a vehicle module 50 waiting on a flat road surface to pick up passengers. A second vehicle module 52 adjusts the angle of its floor 54 to provide a ramp, to allow for passengers, perhaps disabled or elderly passengers, or heavy goods, to be loaded.

Figure 5:
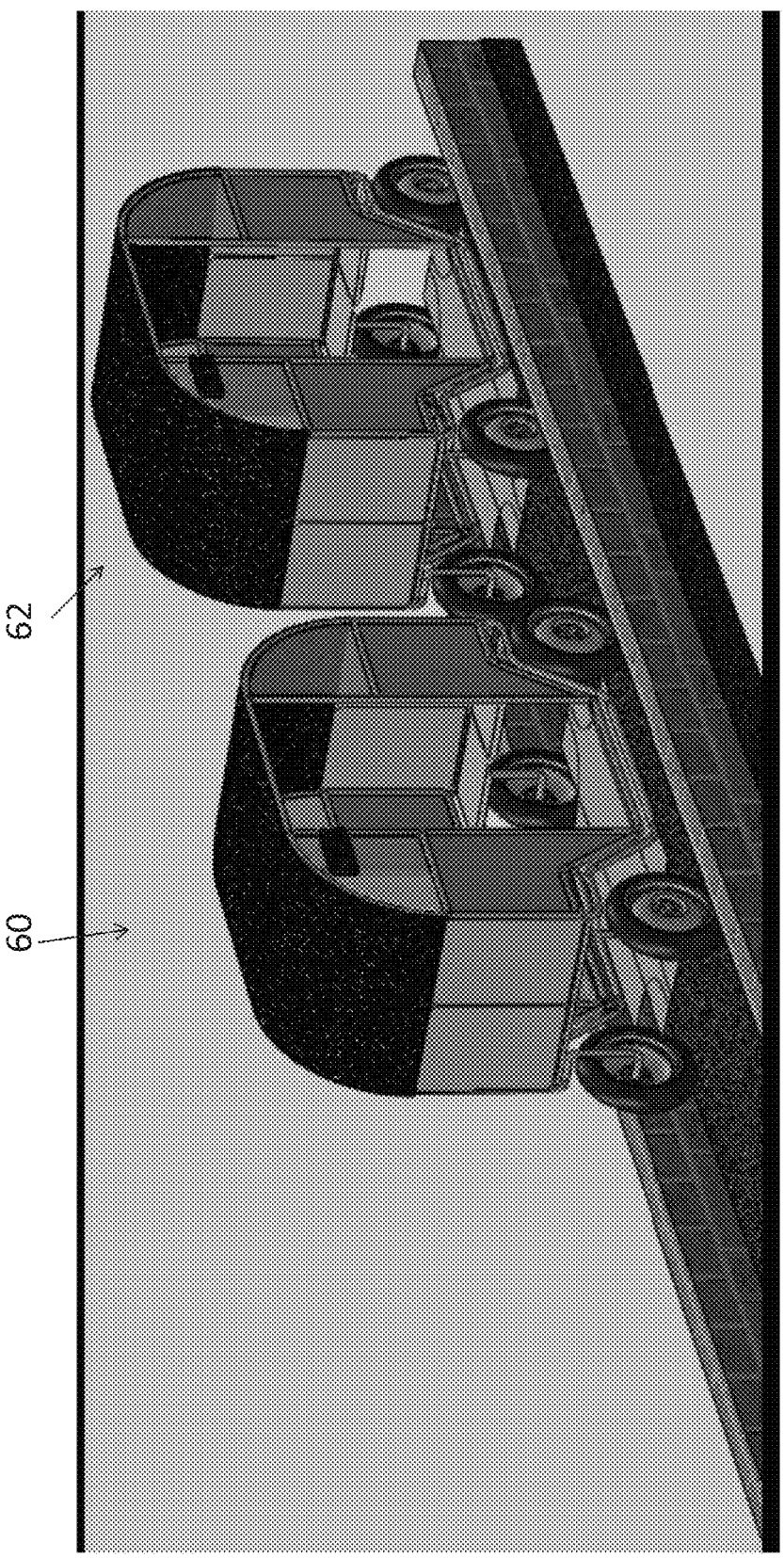
FIG. 5 is a simplified diagram showing two modules on a guided trackway, according to embodiments of the present invention.
Figure 6:
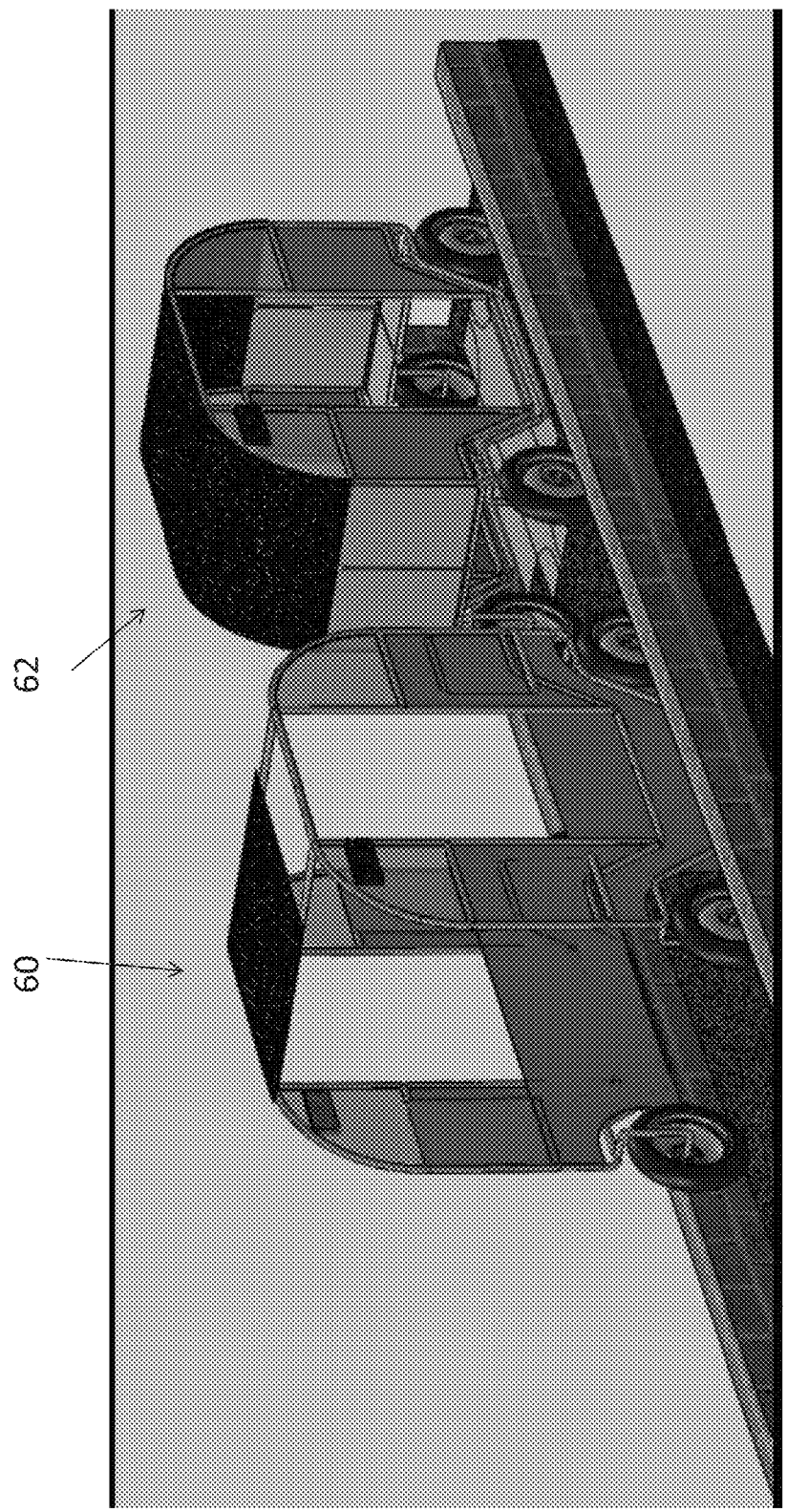
FIG. 6 is a simplified diagram showing the left hand module folding its inner parts and roof and increasing its height and width in preparation for moving past the right hand module, in accordance with the present embodiments.
Figure 7:
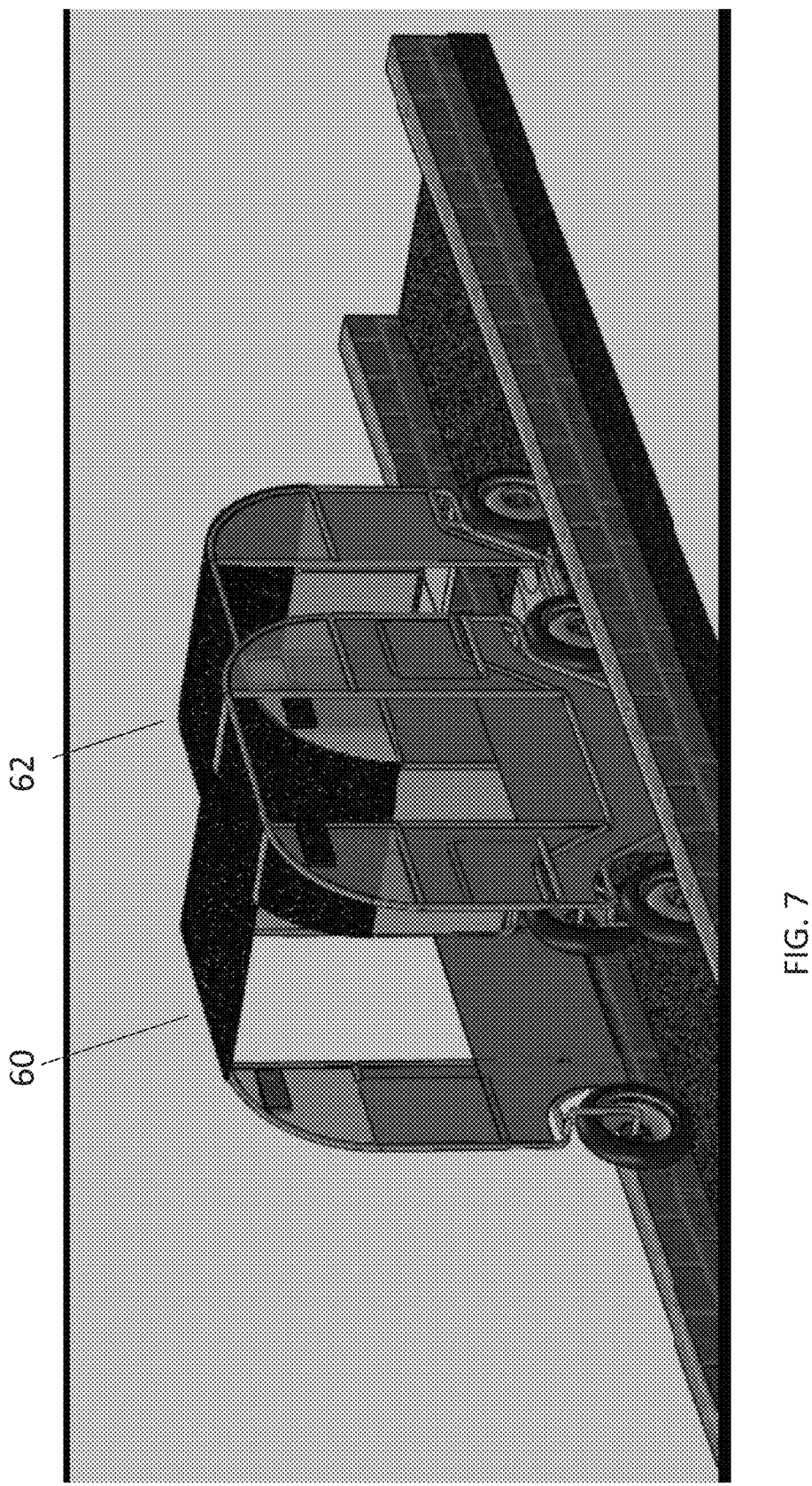
FIG. 7 is a simplified diagram showing the left hand module passing the right hand module in accordance with the present embodiments.

Reference is now made together to Figs. 5, 6 and 7, which show two modules 60 and 62 according to an embodiment of the present invention. In the embodiment of Figs. 5-7 the housing comprises panels on a telescoping frame. Actuators, not shown, are placed at suitable locations on the telescoping frame members to telescope the members when required.

In FIG. 5, both modules are in the same guide track in standard operating mode for carrying passengers. In FIG. 6 the left hand module 60 has folded away its floor, seats and front and rear panels, and used the telescoping members of the frame to telescope itself to a greater width and height.

In FIG. 7 module 60 passes over and around module 62.

Reference is now made to FIGS. 8-16 which illustrate the principle of using the telescopic legs to raise a module, place the wheels on raised guide tracks and allow the vehicle to pass over another vehicle currently sitting in the guide tracks. Although FIGS. 8-16 show a simplified vehicle having only a floor and no housing, the skilled person will know how to adapt the teachings of the present figures for the case of a housing. The heights used may thus be greater than the housing height.

Figure 8:
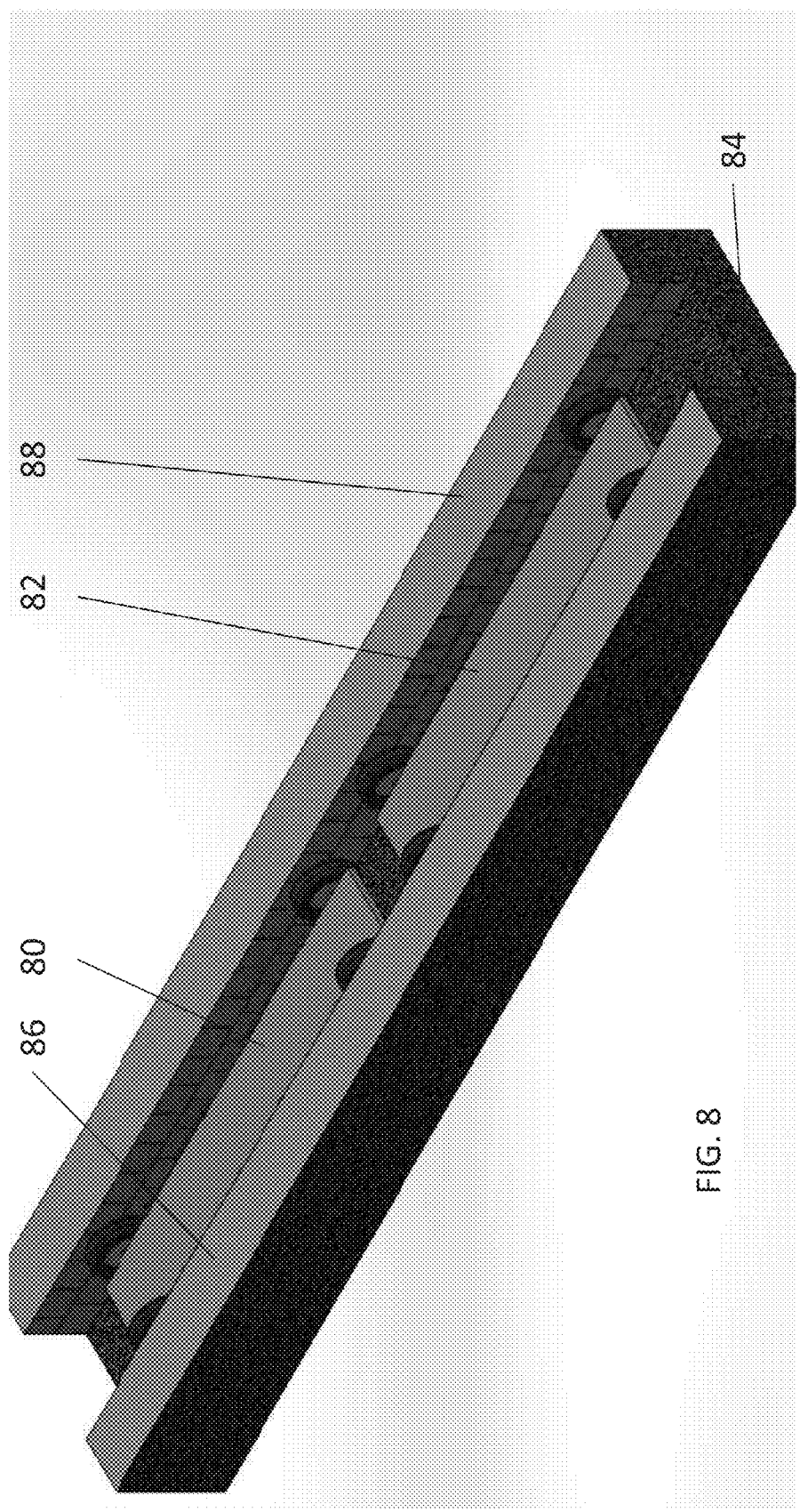
FIGS. 8, 9, 10, 11, 12, 13, 14, 15 and 16 are simplified diagrams illustrating two modules passing each other using the rails of a trackway.

FIG. 8 shows two vehicles 80 and 82 in a guided trackway 84 having raised guide rails 86 and 88.

Figure 9:
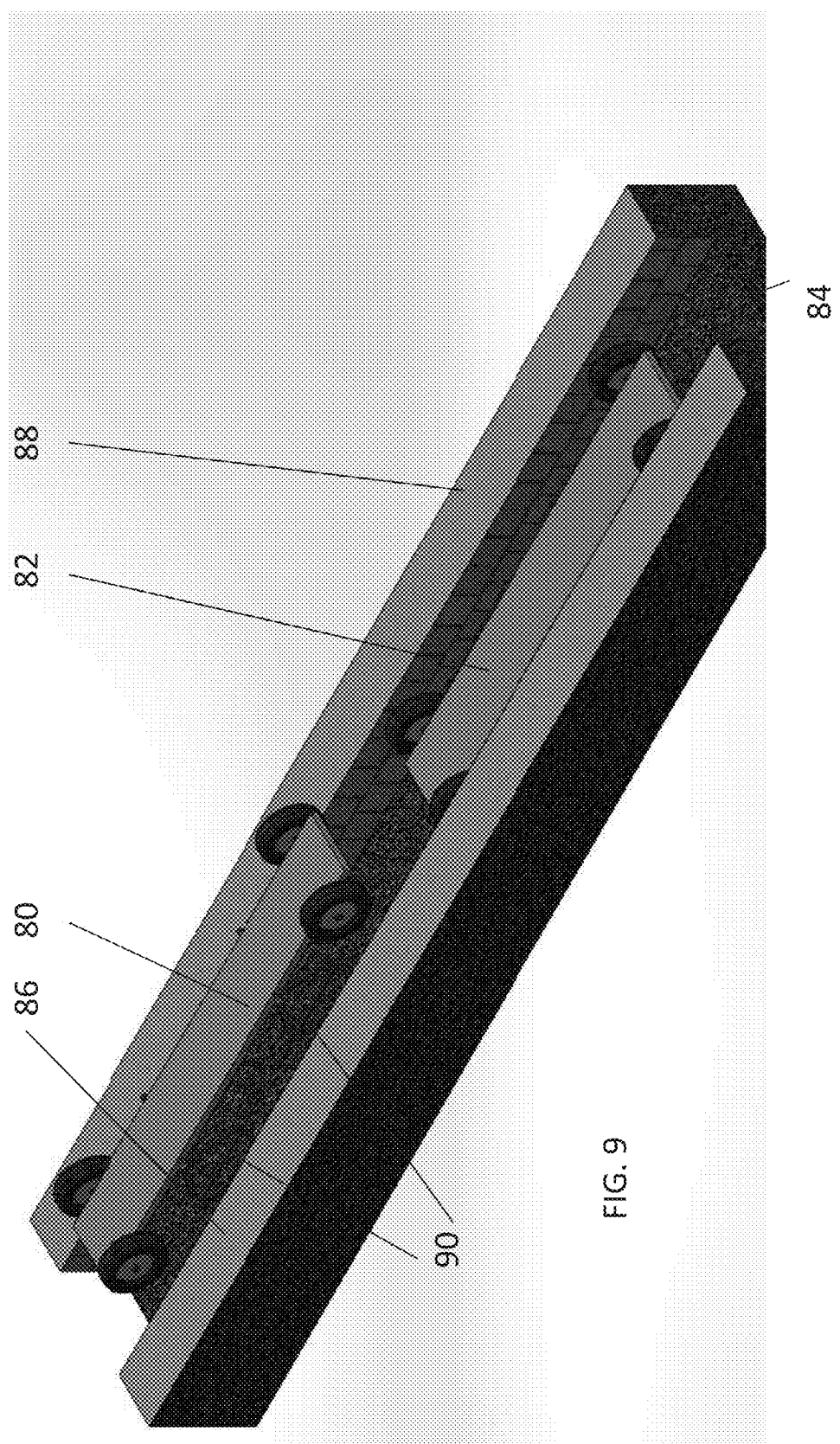

In FIG. 9, module 80 is raised up by legs 90. In the present embodiments the legs are in the form of jacks with a central horizontal bar increasing the width or height of triangular elements.

Figure 10:
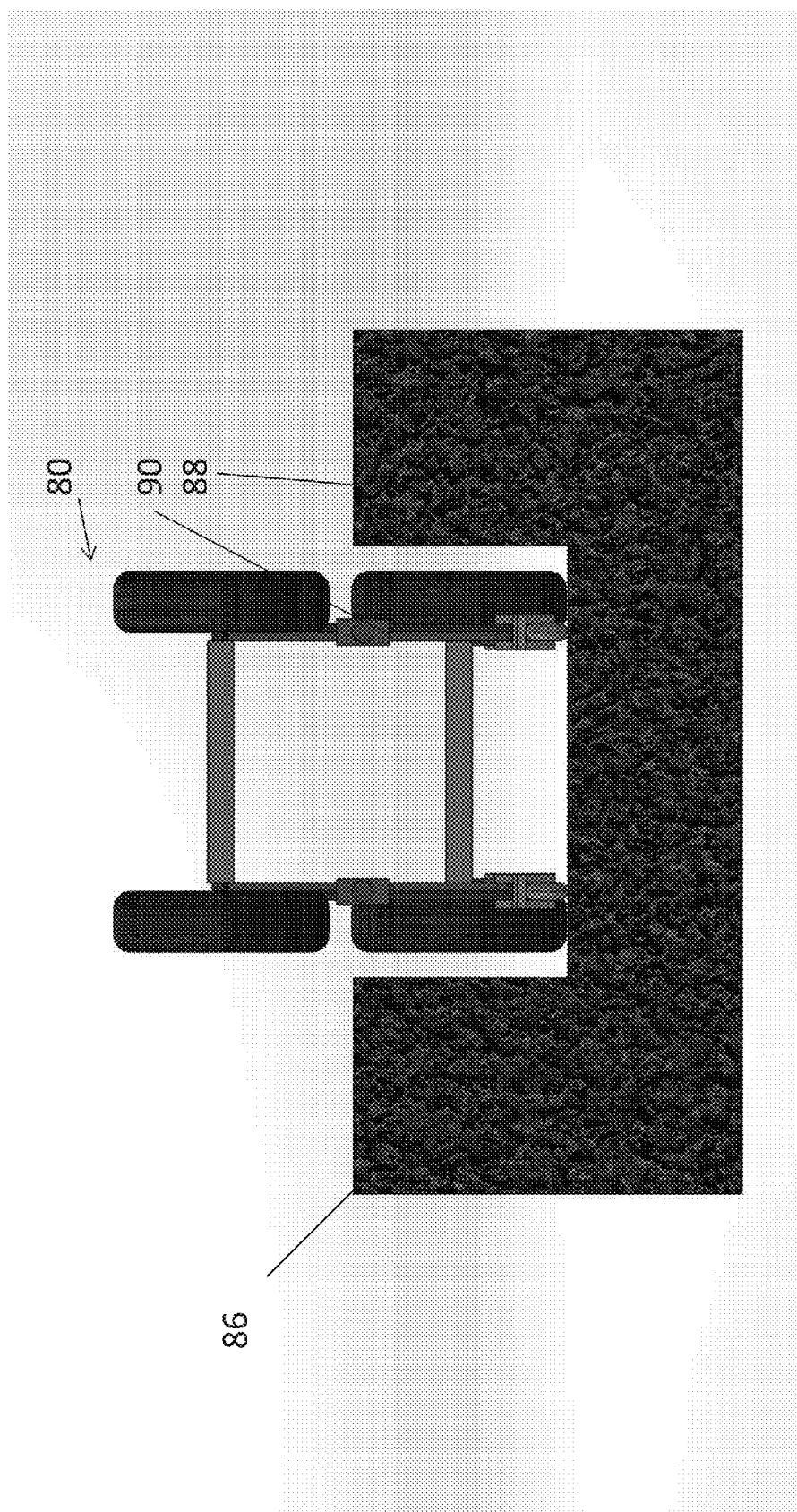

FIG. 10 is a view looking down the track of the situation in FIG. 9. As shown, module 80 is raised up on legs 90. The module 80 is raised up so that its regular wheels 92 and 94 are at the level of the tops of the guide rails 86 and 88.

Figure 11:
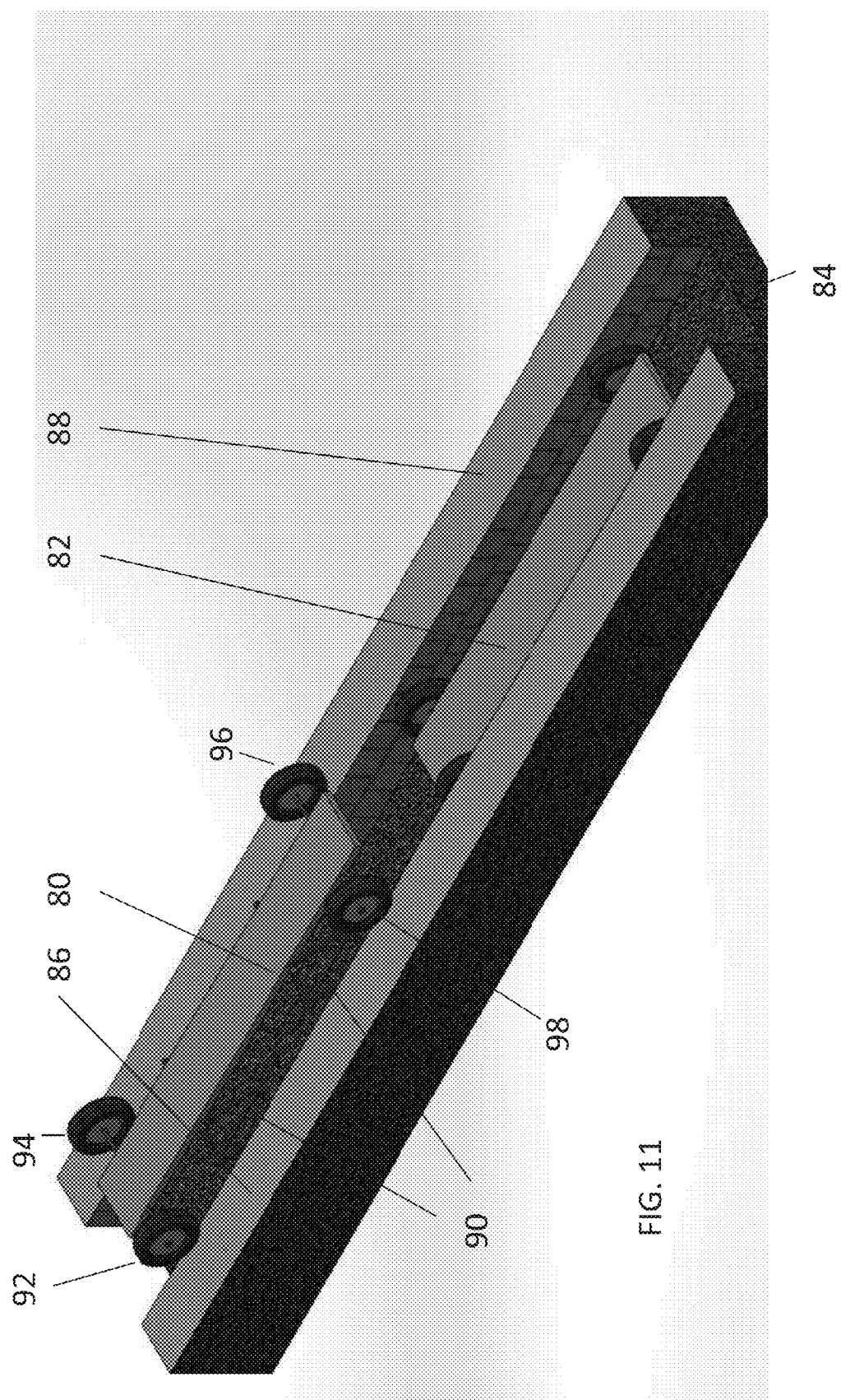

FIG. 11 shows the wheels 92, 94, 96 and 98 of module 80 extended outwardly over the guiderails 86 and 88.

Figure 12:
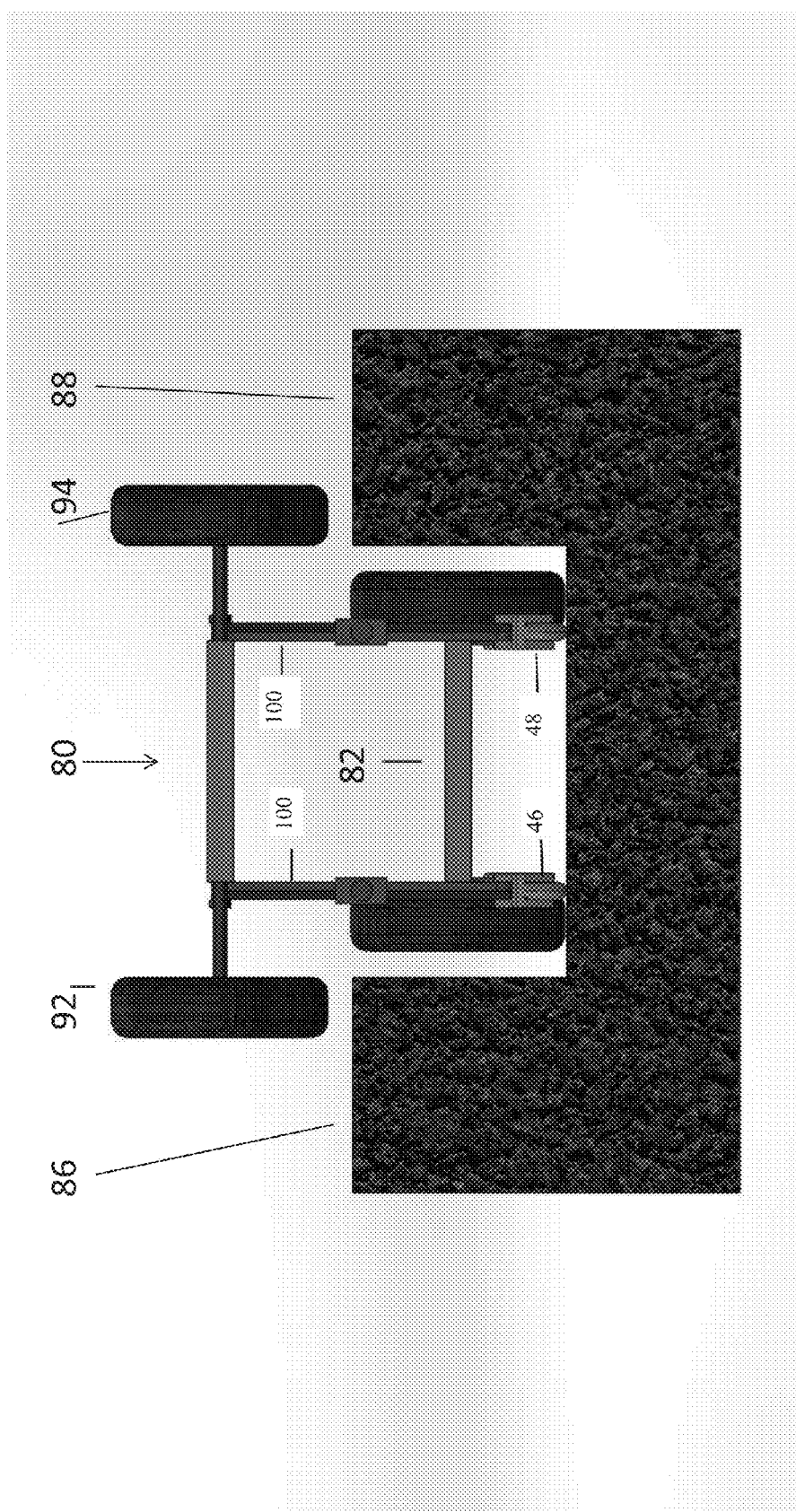

FIG. 12 is a view along the guide tracks of the situation in FIG. 11. In FIG. 12 it can be seen that the wheels 92 and 94 have been extended outwardly over the guide rails 86 and 88.

Figure 13:
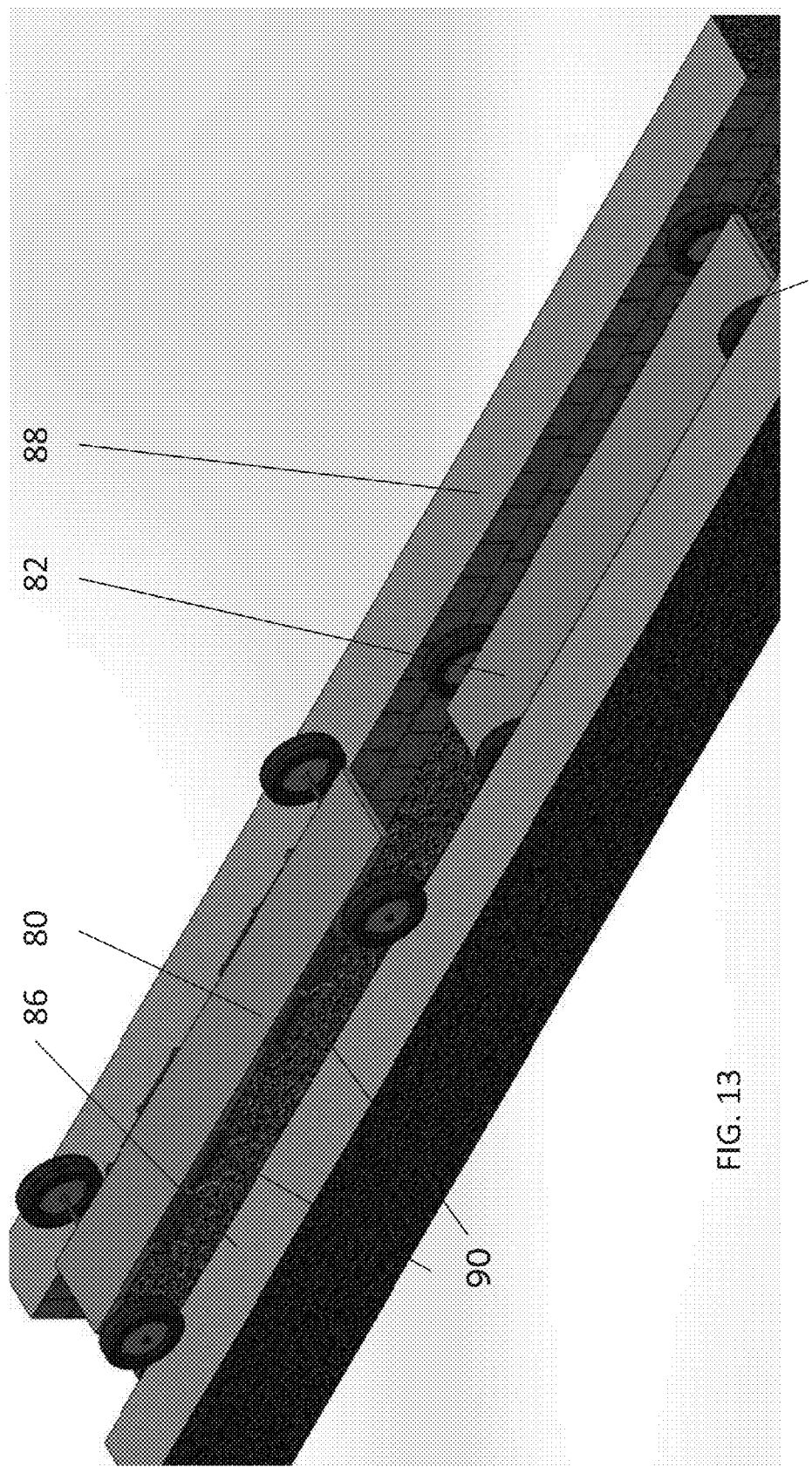
Figure 14:
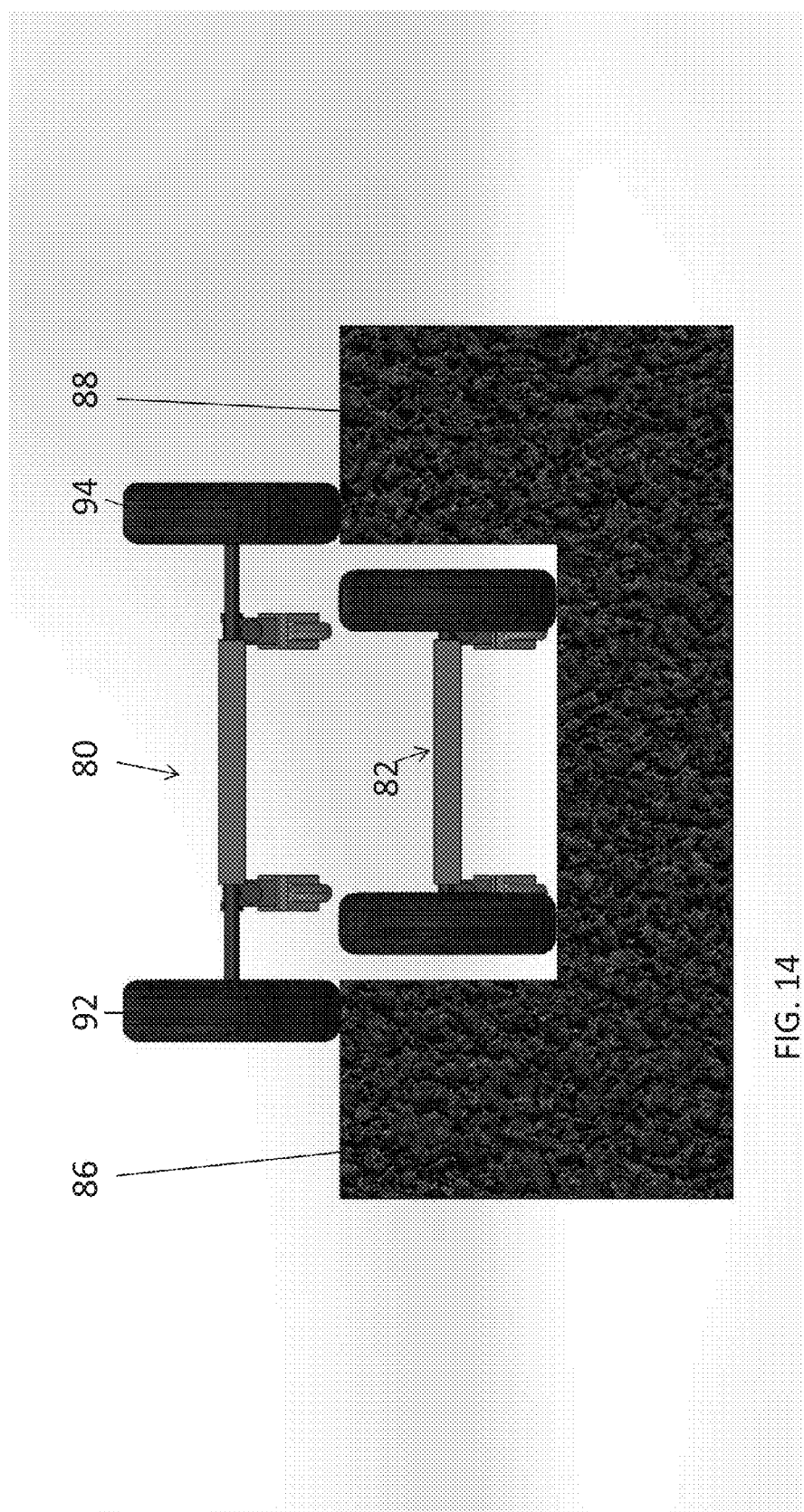
Figure 15:
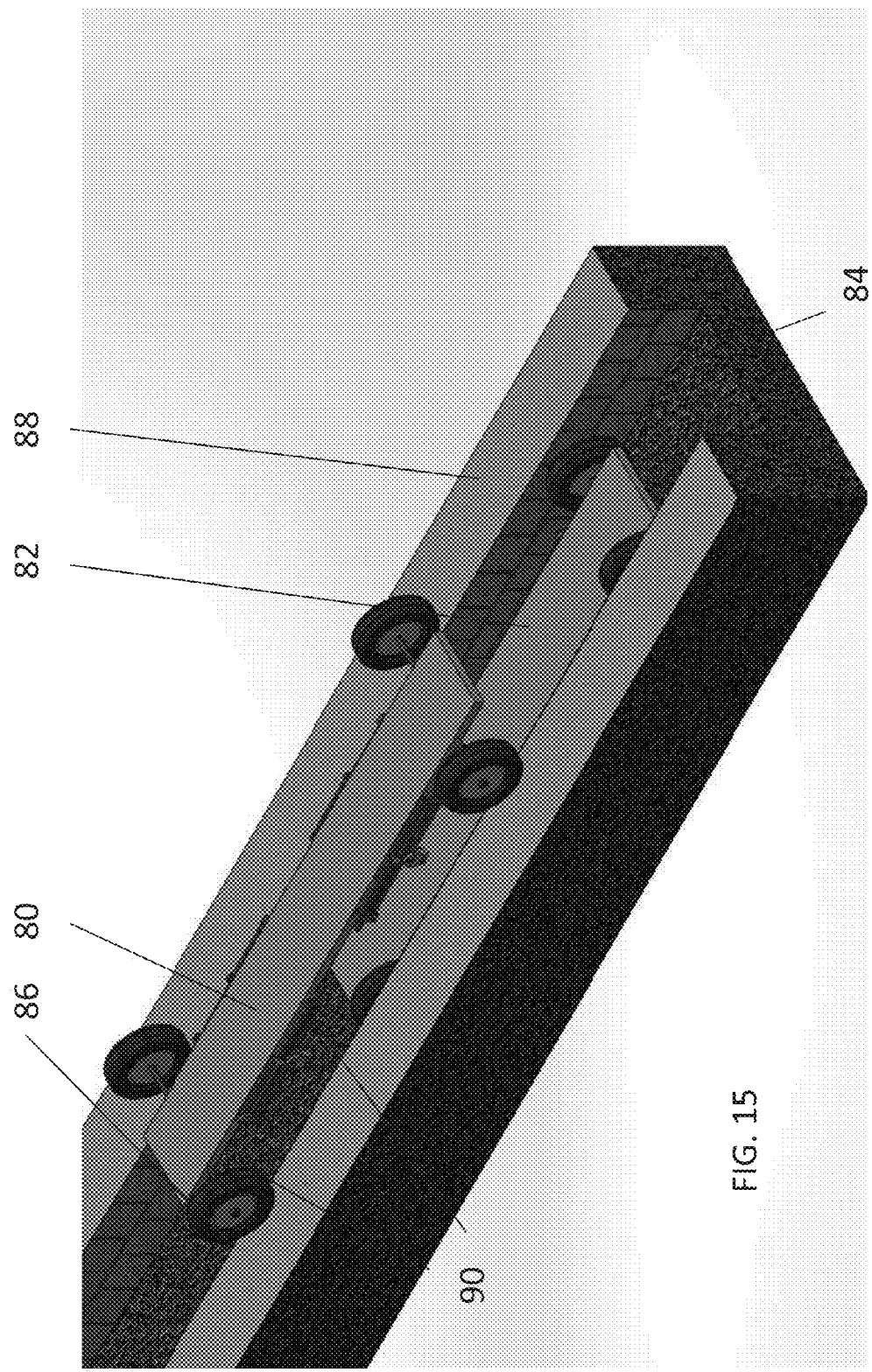
Figure 16:
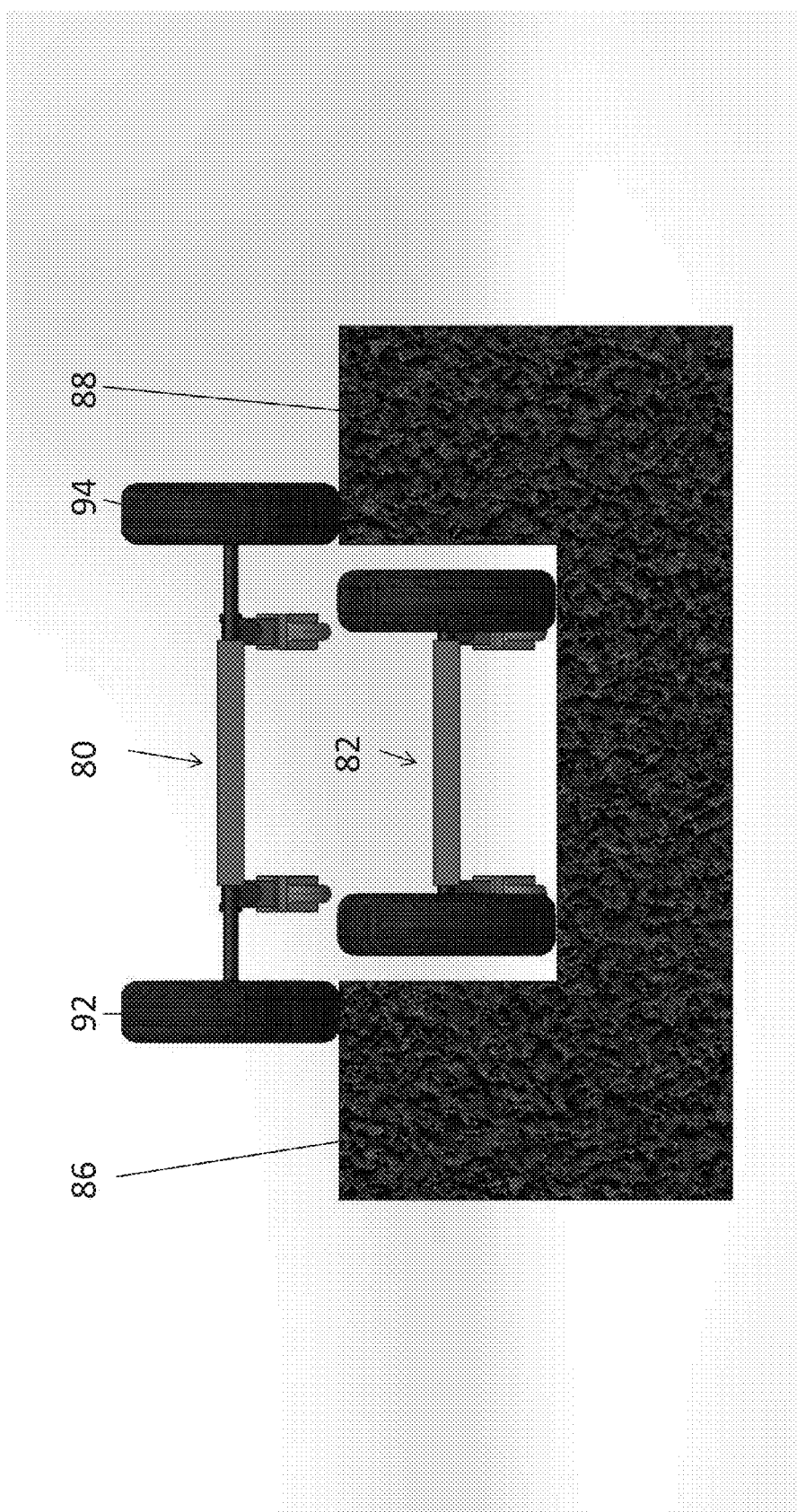

FIGS. 13 and 14 both show from different angles the case in which the wheels now rest on the guide tracks. FIGS. 15 and 16 show module 80 riding over module 82.

Figure 17:
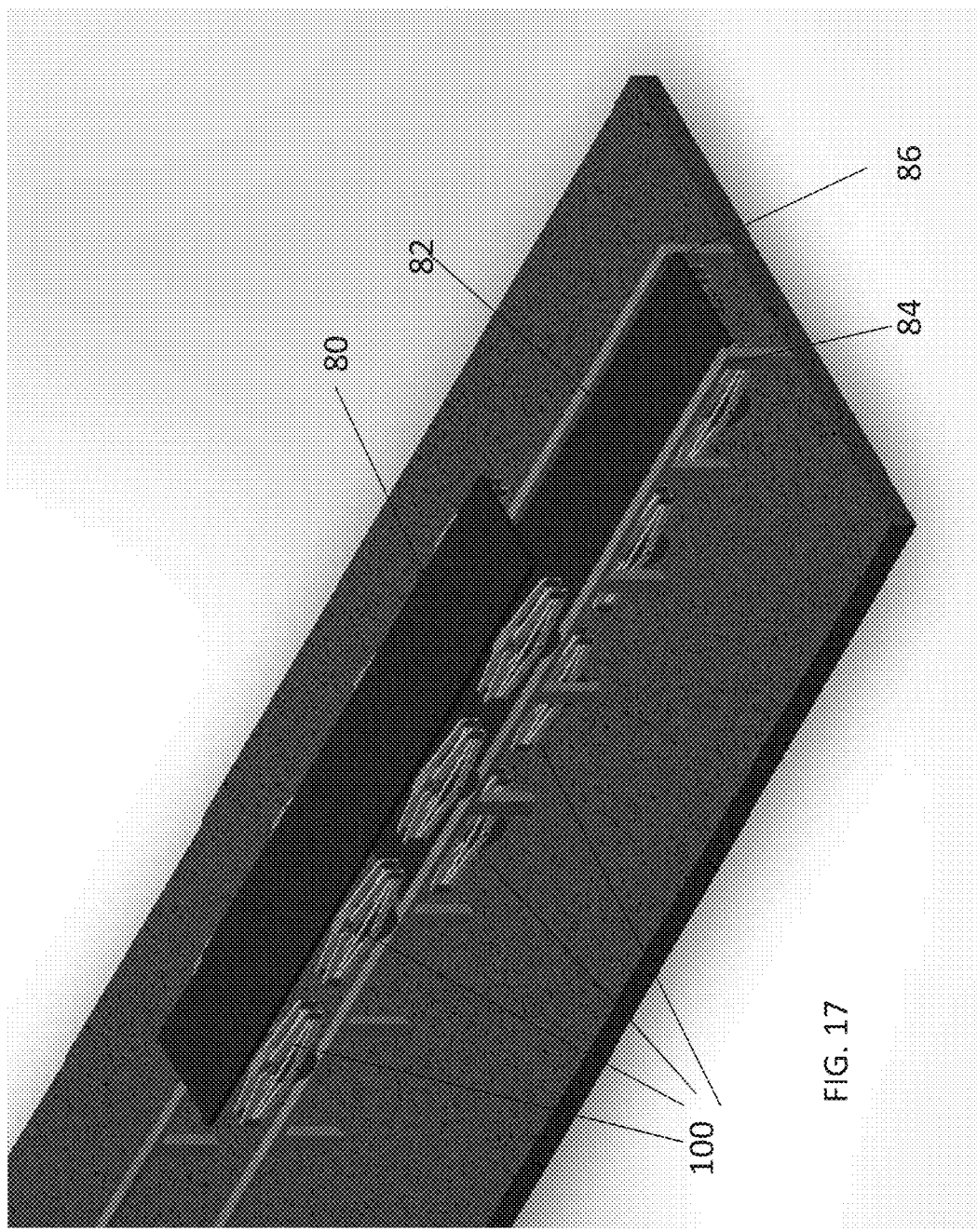
FIG. 17 is a schematic illustration showing one module passing on raised rails over another module, and showing detail of an embodiment in which a variation of a car jack is used to raise the module onto the raised rails.

Reference is now made to FIG. 17, which is a perspective view of the situation in FIGS. 15 and 16 in which module 80 passes over module 82. For simplicity the rails 84 and 86 are shown as raised horizontal bars so as to give a view of the vehicle underneath.

In FIG. 17, telescopic jacks 100 are shown at the sides of the modules. The jacks are of a design well-known for hand-changing of tires and show a triangle structure that is extended outwardly to lower the height following rotation of a central vertical member.

In order to bring the network to its maximum capacity at minimum cost cellular or modular carriers of the kind described above, may be connected into large trains or not as the situation requires. A passenger module may take between two and four passengers. The module may move both on standard roads and dedicated roads. The module may be powered electrically but alternatively can be powered by any other energy source. The resulting network is therefore built from two types of transportation infrastructure, asynchronous infrastructure made up of conventional flat roads, in which vehicles are generally driven by humans and synchronous infrastructure with guide tracks, where vehicle may be driven autonomously. At any time during the course of the day and the week, there are different levels of demand for transportation service (TS) which means that the actual bandwidth may vary between zero and a peak time maximum. In order to provide quality of service (QoS), meaning as near as possible a constant frequency of transport, it is possible to change the number of modules in use to the currently required bandwidth but keep the frequency constant without reducing efficiency.

Since maximum network performance is achieved when the carriers do not suffer congestion, only in-use modules should be present. Out of use modules may be extracted from the network using the ability to drive over other vehicles that was discussed hereinabove.

The network may provide out-of-use parking space for modules not currently in service. The module may also park on the road itself and not interrupt passing traffic. Again, this may be achieved by use of the two modes discussed above. The parking vehicle simply adopts the extended and folded shape—otherwise known as bridge mode, and then modules in service and carrying passengers are able simply to pass through it.

Each of the cells has 3D sensors such as camera or 3D active cameras that enable it to maintain a list of objects surrounding it where per each object the cell has the speed and direction. By knowing its own speed and direction the cell may constantly calculate collision path and maintain a speed that may avoid accidents with people or other vehicles.

Continuous utilization of the network can be achieved if the pipes (roads) are always available. A journey ends with the arrival of the module at its destination, and the module speed falls to zero. At this specific point the road is blocked for the following modules. Stopping or parking bays can be provided at destinations to avoid interrupting flow down the track. But this method has a disadvantage since it makes the infrastructure cost more expensive and static.

Thus in one embodiment, a larger version of the module provides a bridge over the stopped module, allowing other modules to pass over. Such a mobile dynamic bridge module may be located on the road and may allow the trackway to remain available when a module stops to let off passengers. The stationary module does not cause any interference to the traffic running on the road. When a module wishes to stop without affecting the network it signals to such a bridge module.

In one version, the bridge may simply involve guide rails which are wider than the road and expandable modules may simply widen themselves, set themselves on the guide rails and climb the bridge, as shown in FIGS. 8-17, so that the stopped vehicle underneath does not interrupt the traffic.

In an alternative, vehicles actually pass over a bridge module. The bridge may be provided with a sliding ramp segment on both sides which is lowered when a module stops underneath, to enable other modules or even general vehicles not connected with the present embodiments to pass over the section of road blocked by the stationary module. When the need for the bridge is completed the ramp is pulled up and vehicles simply pass underneath.

To summarize, a modular transport system uses a road network built from asynchronous and synchronous roads. Modules may be electrically powered from the road or from overhead lines or powered by batteries or any other energy means. The module may dynamically change its volume as discussed. A bridge mode allows for other modules to pass through. A carrier mode allows the module to carry people or goods. In carrier mode the cell volume is smaller than bridge volume in order to be able to pass through, or bigger in order to climb over the stationary module using side rails.

The vehicle in carrier mode may also climb over a bridge located on the road.

The module may be provided with displays, for example LCD/Plasma/Led etc. to display as traffic signals to other participator in the network such as vehicles and Humans.

The module may be connected to wire-line (Optical/Copper) and/or wireless (Free space Optics/RF)) networks. In the optical free space embodiment the module may communicate with other cells which are in line of sight or at static poles distributed along the roads. The communication may build a local wireless network around the cell, transforming the module into a moving cellular base station. The modules on the roads may thus create a citywide communication network. Both optica and RF possibilities are available, and cameras on the vehicles may be used to keep updated views of the city.

One possibility for powering the module is through an adaptor which is dynamically connected to the unified power and communication network described in U.S. patent application Ser. No. 13/387,118.

The vehicles may include solar panels, for example on their roofs. Stored energy may be made available to other cells on the network if desired.

Modules may be locked to dedicated guide paths or allowed to roam freely on the roads and use the guide paths as convenient.

Location data may be placed on the guided tracks for electronic reading by the modules, instead of GPS data, or in areas such as underpasses where GPS data is not available, to allow vehicles to be aware of and report their locations at all times.

Dedicated modules can be provided for specific purposes, such as modules for shipping goods under secure conditions, ambulances, or even modules for garbage collection.

A module for secure shipment of goods may have individual lockers or secure compartments with access control and destination locations defined by the originator.

Reference is now made to FIG. 18, which is a simplified flow chart illustrating what happens when an empty vehicle meets another vehicle on a guideway and needs to pass—110. In 112 the wheels and side walls are extended outwards using actuators. In 114 legs are telescoped downwards to increase height. In 116, front and rear panels are folded away as shown in FIG. 7. Internal parts such as seating 22 are likewise folded away as shown in FIG. 2. When the height and width are increased and the widthwise panels are folded away, then the empty vehicle is able to pass outside of the other vehicle on the trackway, as illustrated in FIG. 7.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A vehicle module having a height, a width and a length, front and rear vertical panels and a horizontal floor, and wherein said height and width are adjustable and said front and rear vertical panels and said horizontal floor are foldable to allow enlargement of an empty module to pass over another module.

2. The vehicle module of claim 1, being a wheeled vehicle and having axles at each wheel, at least some of said axles further having an actuator located therewith to extend a corresponding wheel outwards, thereby to adjust said width.

3. The vehicle module of claim 1, further comprising downwardly extending telescopic legs, therewith to adjust said height.

4. The vehicle module of claim 1, being a wheeled vehicle and having axles at each wheel, at least some of said axles further having an actuator located therewith to extend a corresponding wheel outwards, thereby to adjust said width, further comprising downwardly extending telescopic legs, therewith to adjust said height, the axles and the legs being operable together to raise the wheels and then extend said wheels outwardly to rest on surrounding raised wheel guides, thereby to pass said vehicle module over another vehicle module.

5. The vehicle module of claim 1, having a plurality of sensors to determine own speed and location and speed and location of surrounding objects, and a processor to generate a safe drive path.

6. The vehicle module of claim 2, further comprising downwardly extending telescopic legs, therewith to adjust said height.

* * * * *